(12) United States Patent
Ramachandrarao et al.

(10) Patent No.: US 7,422,020 B2
(45) Date of Patent: Sep. 9, 2008

(54) ALUMINUM INCORPORATION IN POROUS DIELECTRIC FOR IMPROVED MECHANICAL PROPERTIES OF PATTERNED DIELECTRIC

(75) Inventors: Vijayakumar Ramachandrarao, Portland, OR (US); Grant Kloster, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 11/479,519

(22) Filed: Jun. 30, 2006

(65) Prior Publication Data

US 2008/0000875 A1 Jan. 3, 2008

(51) Int. Cl.
*B08B 6/00* (2006.01)
*H01L 21/302* (2006.01)
(52) U.S. Cl. ............... 134/1.3; 438/704; 438/705; 438/714; 438/722; 438/723; 438/724
(58) Field of Classification Search ........... 134/1.3; 216/56, 57, 62, 76, 80, 97, 101; 438/704, 438/705, 714, 722, 723, 724
See application file for complete search history.

(56) References Cited

U.S. PATENT DOCUMENTS

| | | | | |
|---|---|---|---|---|
| 4,144,636 A | * | 3/1979 | Burkhardt et al. ............ 438/49 |
| 6,653,200 B2 | * | 11/2003 | Olsen ...................... 438/424 |
| 6,737,365 B1 | | 5/2004 | Kloster et al. |
| 6,964,919 B2 | | 11/2005 | Kloster et al. |
| 7,163,900 B2 | * | 1/2007 | Weber ..................... 438/780 |
| 2004/0266184 A1 | | 12/2004 | RamachandraRao et al. |
| 2005/0129926 A1 | | 6/2005 | Kloster et al. |
| 2005/0136554 A1 | * | 6/2005 | Okita et al. ................. 438/3 |
| 2006/0110936 A1 | * | 5/2006 | Hill et al. ................. 438/778 |
| 2007/0251388 A1 | * | 11/2007 | Oyama et al. ............... 96/11 |

OTHER PUBLICATIONS

"Surface reactions in Al2O3 growth from trimethylaluminum and water by atomic layer epitaxy"; Applied Surface Science: □□vol. 107; pp. 107-115; Lakomaa et al.; Nov. 1996'.*
"IR and NMR Study of the Chemisorption of Ammonia On Trimethylaluminum-Modified Silica"; Journal of Physical Chemistry;□□vol. 104, No. 28, pp. 6599-6609; Puurunen et. al.; 2000'.*

* cited by examiner

*Primary Examiner*—George A. Goudreau
(74) *Attorney, Agent, or Firm*—Blakely, Sokoloff, Taylor & Zafman LLP

(57) ABSTRACT

A porous dielectric layer is formed on a substrate. Aluminum is incorporated in the porous dielectric layer with a pattern process using an Aluminum gas precursor. The incorporated Aluminum improves the mechanical properties of the porous dielectric layer.

10 Claims, 6 Drawing Sheets

ALUMINUM INCORPORATION IN POROUS DIELECTRIC FOR IMPROVED MECHANICAL PROPERTIES OF PATTERNED DIELECTRIC

TECHNICAL FIELD

This invention relates to the field of semiconductor integrated circuits, and, in particular, to porous dielectric materials.

BACKGROUND

An integrated circuit (IC) typically comprises numerous semiconductor devices formed on a single crystal silicon substrate. The semiconductor devices can be transistors, diodes, etc. The semiconductor devices must be connected with each other using conductive lines for the IC to function. The conductive lines are effectively metal wires that allow electrical communication between the semiconductor devices. Newer ICs, and especially microprocessors, are becoming increasingly complex. Because of the increasing number of semiconductor devices found in newer ICs, the number of conductive lines needed to connect the devices is also increasing. For complex ICs, a single layer of conductive lines is insufficient. As a result, the conductive lines must be layered upon one another to create layers of metallization. In order to isolate the conductive lines an interlayer dielectric (ILD) is used. The ILD is an insulating layer, such as silicon dioxide (SiO.sub.2), which prevents shorts and unwanted communication between the conductive lines.

One way to fabricate layers of metallization for an IC involves using what is known as a damascene process. The first procedure of a damascene process is to deposit an ILD. An ILD is deposited either directly on a substrate, or on top of another existing layer of metallization. Once the ILD is deposited, portions of the ILD may be etched away to form recessed features, such as trenches and vias, which will accommodate the conductive lines. A trench can be created to accommodate an interconnect, which can connect different regions of the IC. A via can be created to accommodate either a via or a contact which will allow for communication between the interconnects of other layers or directly with the semiconductor devices in the substrate. A damascene process which creates either only trenches or vias is known as a single damascene process. A damascene process which creates both trenches and vias at once is known as a dual damascene process. In a dual damascene process, trenches and vias are created together.

After the recessed features are created, metal, such as copper or aluminum, is deposited in them to create the conductive lines. The deposition process typically deposits excess metal, which overfills the trenches and covers the entire surface of the ILD. The excess metal can be removed using a chemical mechanical polishing (CMP) process. The CMP process involves introducing a chemical slurry to the surface of the ILD while using a rotating polishing pad to remove excess metal and planarize the surface of the ILD.

Because feature sizes in ICs have recently become so small, the conductive lines in the layers of metallization are now separated by increasingly smaller gaps. An ILD comprises a dielectric material, which has a tendency to store charge, and can cause problems such as crosstalk and capacitive coupling between the conductive lines. A typical material used for ILDs is silicon dioxide ($SiO_2$). Silicon dioxide has a dielectric constant (k) of approximately 4.0. With the reduction in feature size and subsequent reduction in distance between conductive lines, it has become desirable to use low-k dielectrics to reduce crosstalk and capacitive coupling. A low-k dielectric is typically defined as one that has a dielectric constant of less than that of $SiO_2$, or of less than 4.0. Examples of low-k dielectrics include fluorosilicate glass (FSG) and carbon doped oxides (CDO).

One way to lower the dielectric constant (k) is to form pores in the dielectric material. For example, some dielectric materials use thermally activated porogens. When heat is applied, the porogen may decompose and/or volatilize, leaving pores in the dielectric material. For example, temperatures in the range of about 250 degrees C. to about 450 degrees C., which may be reached in dual damascene processing, may be used to thermally activate a porogen.

However, low-k dielectrics tend to be a mechanically weak, typically because they include pores or air pockets. Air pockets are created in a dielectric material in order to reduce the dielectric contestant because the dielectric constant (k) of air is approximately 1.0. The removal of material in order to create pores within an ILD results in a structurally weaker material, which may be damaged during processing. For example, the CMP process can typically cause cracks, shorts, and other deformities in the ILD. Using a low-k dielectric material may ultimately reduce product yields because of damage caused during processing.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Figure 1:
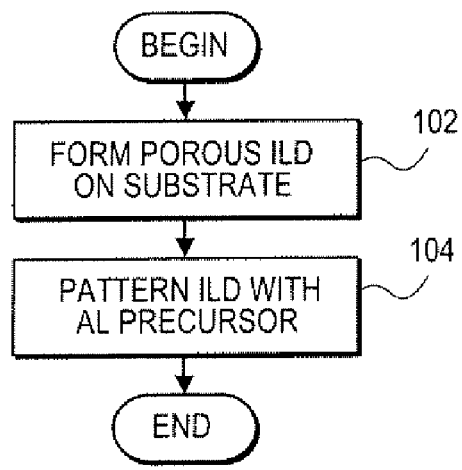
FIG. 1 is a flow diagram illustrating a method for incorporating Aluminum in porous dielectric materials in accordance with one embodiment.

FIG. 1 illustrates is a flow diagram of a method for incorporating Aluminum in porous dielectric materials. At 102, a porous dilectric material is formed on a substrate. Those of ordinary skills in the art will recognize that there are several methods for forming a porous dielectric material.

For example, a dielectric layer containing porogen may be first formed. The porogen may be a polymer mixed with the dilectric material. Various polymers may be used as porogens. In accordance with another embodiment, the pores may be formed in the dielectric material after metal interconnects are formed in or through openings in the dielectric layer. The porogen in the dielectric layer may be dissolved and/or desorbed in a solvent, enhanced by sonication. Sonication is irradiation by sound waves to increase the rate of the dissolution or desorption reaction. According to one embodiment, the porogen in the dielectric layer is dissolved and/or desorbed in a solvent, enhanced by sonication. Sonication is irradiation by sound waves to increase the rate of the dissolution or desorption reaction. In one embodiment, the porogen may be dissolved out of the dielectric layer by immersing the dielectric layer (or the entire substrate) in a liquid solvent in a sonication bath. The sonication energy effectively lowers the surface tension of the liquid solvent in the bath to enhance solvent penetration into the dielectric layer that includes a porogen.

Dissolution or desorption of the porogen creates voids in the interlayer dielectric to lower the dielectric constant of the dielectric material. As a result of dissolving or desorbing the porogen in a sonication bath, a porous dielectric material is formed after the metal interconnects are in place, so that the metal interconnects have smooth sidewalls. For example, dielectric material after sonication enhanced dissolution of porogens may have at least 50% porosity.

In one embodiment, porogens in the dielectric material may be selected to have desorption temperatures at or above the maximum temperatures of dual damascene processes, i.e., above about 400 degrees C., and more preferably above about 450 degrees C. Optionally, porogens that evaporate, dissolve, or desorb at higher temperatures (i.e., 600 degrees C. or higher) also may be used. Thus, pores may not be formed by thermal activation of porogens during processing steps at or below such temperatures.

An appropriate solvent may be selected for a specified polymer porogen. For example, the polymers and appropriate solvents for use in various embodiments of the invention may be grouped generally as non-polar systems, slightly polar systems, or highly polar systems. The choice of system may depend on other processing constraints such as thermal budgets, or solvent compatibility with capping layers such as hard masks or etch stops.

Another example includes forming a dielectric layer on a substrate, and pores in the dielectric layer by directing an electron beam at the material after metal interconnects are formed in or through openings in the dielectric layer. The dielectric material may be a silicon dioxide, or a carbon-doped oxide (CDO).

In one embodiment, the dielectric material includes a porogen susceptible to electron beam fragmentation or degradation, having a thermal stability greater than about 400 degrees C., and more preferably above about 450 degrees C.

In one embodiment, the dielectric may be an oxide based matrix, with an organic polymer porogen that is susceptible to electron beam fragmentation. In another embodiment, the porogen may be an electron beam photoresist material based on styrene, butene, or acrylate chemistry in a cross-linked aromatic polymer. For example, polymethyl methacrylate (PMMA) may be included in a cross-linked aromatic polymer to produce a thermally stable material that is susceptible to electron beam fragmentation. These are examples of thermally stable materials that may be used as porogens that are susceptible to electron beam degradation or fragmentation.

An electron beam is directed at the dielectric layer to create pores in the material. In one embodiment, a flood electron beam may be directed at the dielectric layer, exposing most or all of the substrate at once. Optionally, the electron beam may be targeted to treat the dielectric layer at a specified depth. In another embodiment, a thin electron beam may be scanned across the substrate or dielectric surface.

As a result of directing the electron beam at the dielectric material, porogens in the dielectric layer may fragment, degrade, and/or decompose. The dielectric layer may contain porogens that fragment, degrade and/or decompose at relatively low energies to form volatile species, which may be removed from the material.

For example, in one embodiment, CDO dielectric material may undergo carbon depletion during treatment with an electron beam. When so treated with an electron beam, larger carbon chains may produce larger pores and a higher degree of porosity, resulting in a lower dielectric constant (k).

In one embodiment, the dielectric layer also may be heated after the electron beam is directed at the substrate. For example, the porogen or pore-generating material may fragment into components that are volatile at lower temperatures, i.e., below about 250 degrees C. The volatile fragments may be removed by heating.

The electron beam directed at the dielectric layer can achieve significant porosity, for example, at least 50% porosity, resulting in a dielectric layer having a low dielectric constant, for example, below about 3.0. If the electron beam is applied after metal interconnects are formed in the dielectric layer, the side walls of the metal interconnects may be smooth instead of rough. Additionally, the dielectric layer may have high structural integrity sufficient to support additional layers above it.

At 104, the porous dielectric material is patterned with an Aluminum gas precursor. The patterning may be accomplished by exposing the porous dielectric material to the Aluminum gas precursor. The temperature of the Aluminum gas precursor may be between about 250 C to about 400 C The patterning process forms Silanol groups in the dielectric material.

In accordance with one embodiment, the Aluminum gas precursor may further comprises a Trimethyl Aluminum (TMA) gas. The porous dielectric material may be repeatedly exposed to ambient atmosphere between exposures of the porous dielectric material to the TMA gas. In accordance with another embodiment, the Aluminum gas precursor may further comprises an Aluminum Tri Sec Butoxide (ATSB) gas.

The time exposure of the porous dielectric to the Aluminum gas precursor may vary to adjust the concentration of the Aluminum in the porous dielectric material. The amount of the Aluminum gas precursor may be modified to adjust the concentration of Aluminum in the porous dielectric. Accordingly, the concentration of the Aluminum in the porous dielectric material may be adjusted to increase Young's modulus and hardness of the porous dielectric material. In accordance with one embodiment, the Aluminum gas precursor may include an Aluminum concentration of about less than 5%.

For illustration purposes, the following results may be obtained after exposing the porous dielectric material to the Aluminum gas precursor:

In a first process using TMA vapor at 350 degrees C., the following was obtained: 4.9% (Concentration of Aluminum), 2.7 (k dielectric constant), 10.1 (E GPa), and 1.5 (H GPa).

In a second process using TMA vapor at 350 degrees C. with a time exposure five times longer than the first process, the following was obtained: 9.4% (Concentration of Aluminum), 3.9 (k dielectric constant), 13.7 (E GPa), and 1.5 (H GPa).

Figure 2:
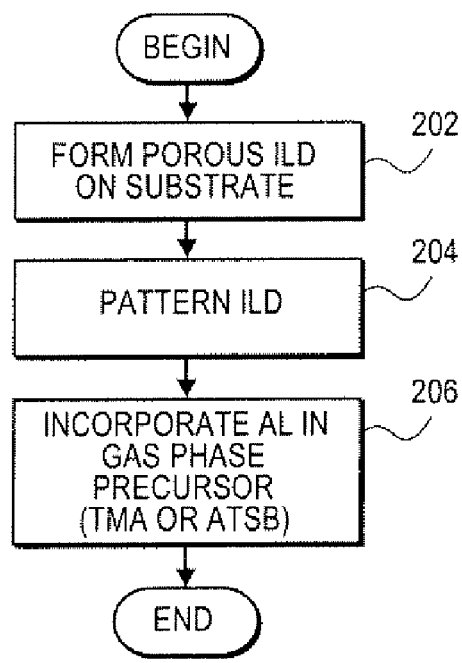
FIG. 2 is a flow diagram illustrating a method for incorporating Aluminum in porous dielectric materials in accordance with another embodiment.

FIG. 2 is a flow diagram illustrating a method for incorporating Aluminum in porous dielectric materials. At 202, a porous dielectric material is formed on a substrate. At 204, the porous dielectric material is patterned. The patterning includes cleaning the porous dielectric material with a water-based cleaning solution to form Silanol groups in the porous dielectric material. At 206, Aluminum is incorporated in a gas precursor. The porous dielectric material is then exposed to the gas precursor. The Silanol groups react with the Aluminum in the gas precursor. For example, the Aluminum in the gas precursor may have a concentration of about less than 5%.

In accordance with one embodiment, the surface of the porous dielectric material is saturated with Trimethyl Aluminum (TMA). The surface of the porous dielectric material is then exposed to air or oxygen. The saturation and air/oxygen exposion process is repeated to increase formation of Aluminum bonds in the porous dielectric material.

In accordance with another embodiment, the reaction with the Aluminum in the gas precursor may be accomplished by heating an Aluminum Tri Sec Butoxide solution to form a vapor. The porous dielectric material is then exposed to the vapor.

After the reaction to the Aluminum in the gas precursor, the porous dielectric material may have a Young's modulus (E) of about 10 or greater GPa, a hardness (H) of about 1 or greater GPa, and a dielectric constant of about 2 or greater.

Figure 3:
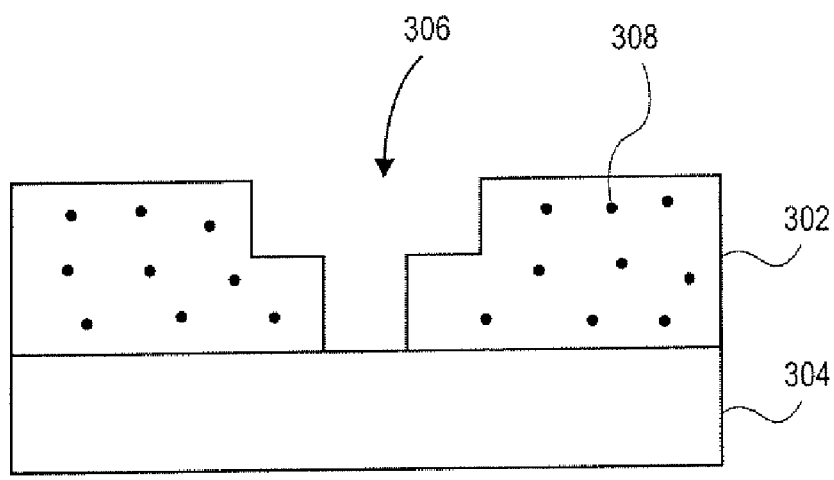
FIG. 3 is an illustration of a cross-sectional side view of a porous dielectric layer formed on a semiconductor substrate in accordance with one embodiment.

FIG. 3 is an illustration of a cross-sectional side view of a porous dielectric layer 302 formed on a semiconductor substrate 304. The porous dielectric layer 302 may include pores 308 within an SiO2—based material. Alternatively, the porous dielectric layer 302 may include a polymer-based material, or may be deposited by chemical vapor deposition (CVD) or plasma enhanced chemical vapor deposition (PECVD). Techniques for forming the porous dielectric layer 302 were previously described with respect to FIGS. 1 and 2.

An opening 306 may be made in the dielectric layer 302 by patterning using photolithography techniques. The opening 306 may extend partially or completely through the dielectric layer 302. The opening in the dielectric layer 302 may be formed using a dual damascene. Those of ordinary skills in the art with recognize that there are other methods of forming an opening in the dielectric layer 302, such as a single damascene, or a direct patterning process, for example.

Metal interconnects (not shown) may be formed in the opening 306. The metal interconnects may be copper or other metal lines or traces that extend partially or completely through the dielectric layer 302 and may contact the underlying metal layer. Optionally, formation of the metal interconnects may include processing steps to polish and/or planarize the surface of the structure.

Figure 4A:
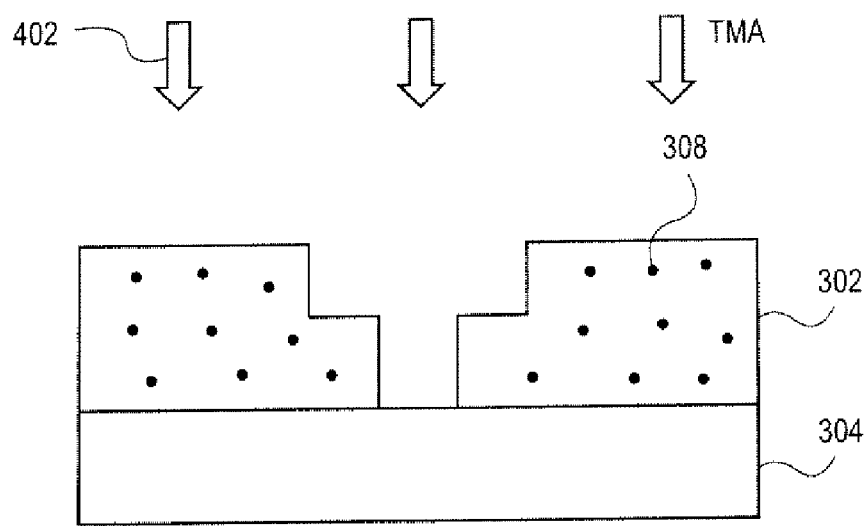
FIG. 4A is an illustration of the structure of FIG. 3 subjected to a patterning process with Trimethyl Aluminum (TMA)

FIG. 4A is an illustration of the structure of FIG. 3 subjected to a patterning process with Trimethyl Aluminum (TMA) 402 in accordance with one embodiment. The porous dielectric layer 302 and the substrate 304 are exposed to TMA 402 at elevated temperatures (for example, from about 250 degrees C. to 400 degrees C.). In accordance with one embodiment, the surface of the porous dielectric layer 302 is saturated with TMA 402. The surface of the porous dielectric layer 302 is then exposed to air or oxygen. The saturation and air/oxygen exposure process is repeated to increase formation of Aluminum bonds in the porous dielectric material.

Figure 4B:
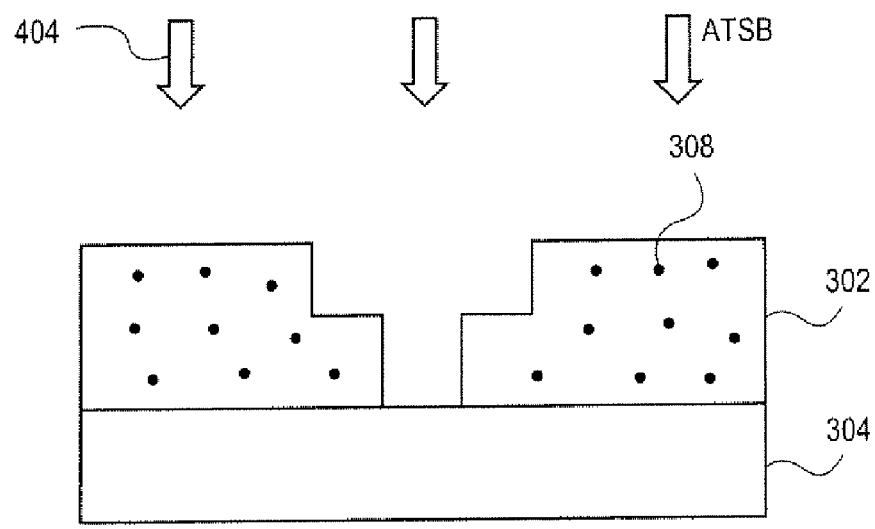
FIG. 4B is an illustration of the structure of FIG. 3 subjected to a patterning process with Aluminum Tri Sec Butoxide (ATSB)

FIG. 4B is an illustration of the structure of FIG. 3 subjected to a patterning process with Aluminum Tri Sec Butoxide (ATSB) 404 in accordance with another embodiment. The reaction with the Aluminum in the gas precursor may be accomplished by heating the ATSB 404 solution to form a vapor. The porous dielectric layer 302 and the substrate 304 are then exposed to the vapor.

Figure 5:
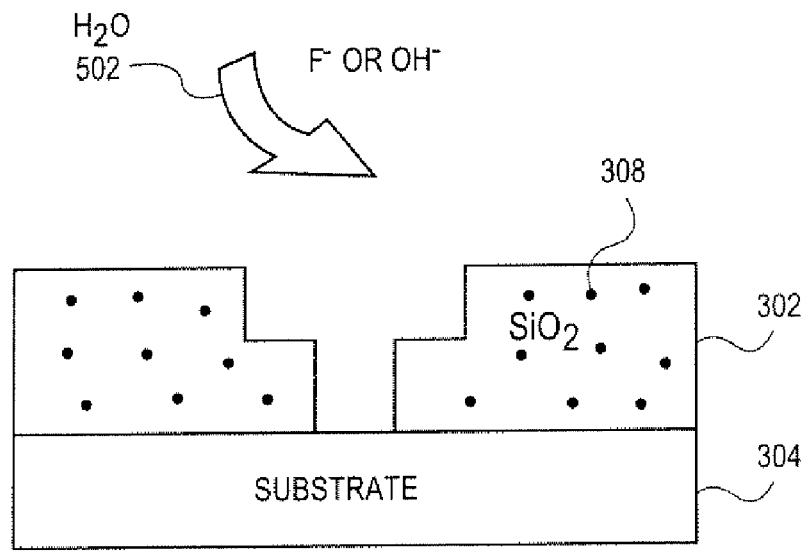
FIG. 5 is an illustration of the structure of FIG. 3 subjected to cleaning chemicals of the patterning process.
Figure 6:
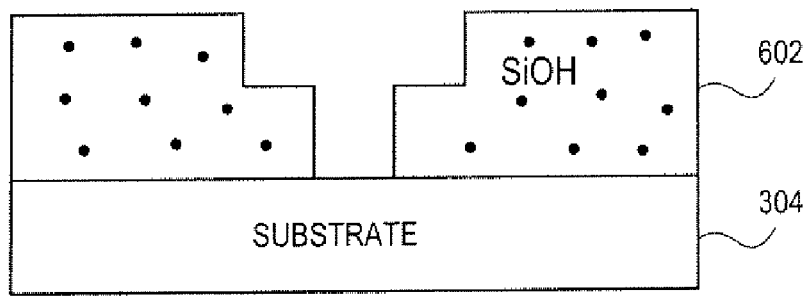
FIG. 6 is an illustration of the structure of FIG. 5 after exposing the ILD to the cleaning chemicals.

FIG. 5 is an illustration of the structure of FIG. 3 subjected to cleaning chemicals of the patterning process. The porous dielectric layer 302 reacts with the F— or the OH— contained in the presences of water 502. For example, SiO2 in the porous dielectric layer 302 reacts with F— or OH— to form SIOH groups. The resulting structure after exposure to the cleaning chemicals is illustrated in FIG. 6. The porous dielectric layer 602 now contains SiOH groups.

Figure 7:
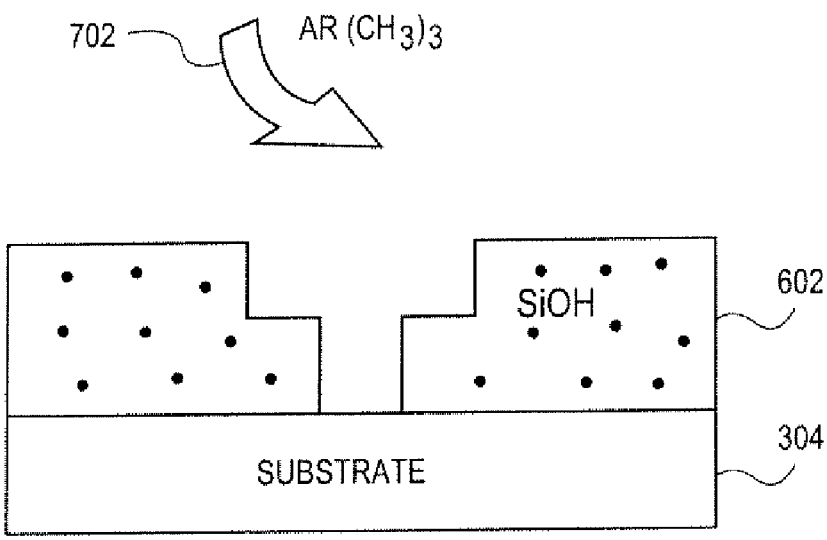
FIG. 7 is an illustration of the structure of FIG. 6 subjected to an aluminum precursor gas.
Figure 8:
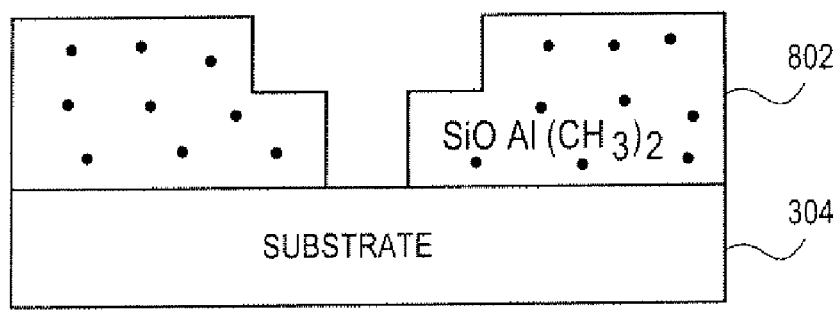
FIG. 8 is an illustration of the structure of FIG. 7 after exposing the ILD to an aluminum precursor gas.

FIG. 7 is an illustration of the structure of FIG. 6 subjected to the aluminum precursor gas 702. FIG. 8 is an illustration of the structure of FIG. 7 after exposing the structure to the aluminum precursor gas 702. Aluminum chains react with SiOH groups. The Aluminum thus becomes incorporated throughout the dielectric layer 602 resulting in the aluminum porous dielectric layer 802.

Figure 9:
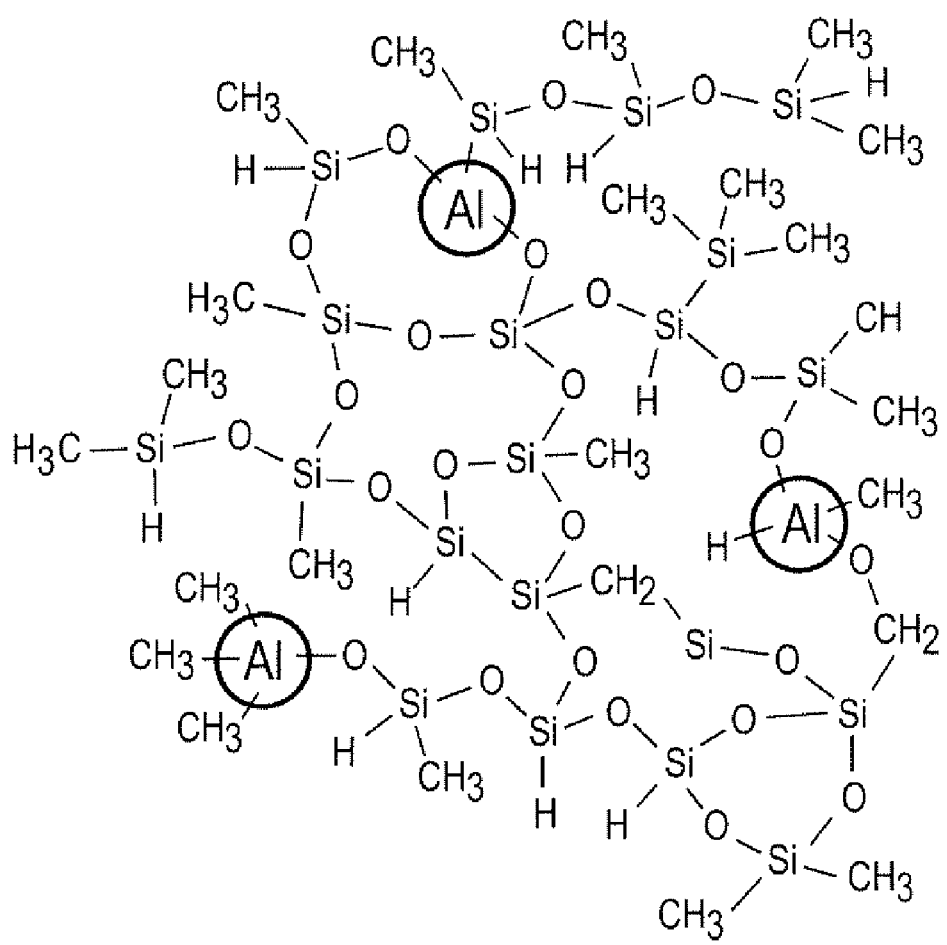
FIG. 9 is a schematic of the resulting elemental structure of the ILD after the patterning process.

FIG. 9 is a schematic of the resulting elemental structure of the ILD after the patterning process. The following chain reaction may envisioned:

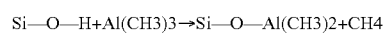

Si—O—H+Al(CH3)3→Si—O—Al(CH3)2+CH4

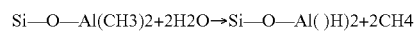

Si—O—Al(CH3)2+2H2O→Si—O—Al( )H)2+2CH4

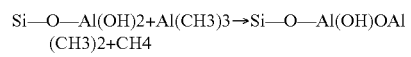

Si—O—Al(OH)2+Al(CH3)3→Si—O—Al(OH)OAl(CH3)2+CH4

The above process presents the following advantages. The mechanical properties (modulus and hardness) of the ILD may be enhanced for downstream packaging steps. The above process can be incorporated in the patterning process of a "standard porous ILD", such as one that contains Si, O, and C. The Si—OH bonds are transformed into beneficial Si—O—Al bonds during wet cleaning processes to improve the thermo-mechanical properties of the film.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   forming a porous dielectric layer on a substrate;
   exposing the porous dielectric layer with an Aluminum gas precursor; and
   forming Silanol groups in the porous dielectric layer,
   wherein the Aluminum gas precursor comprises an Aluminum Tri Sec Butoxide (ATSB) gas.

2. The method of claim 1 wherein the Aluminum gas precursor is between about 250C to about 400C.

3. The method of claim 1 further comprises:
   exposing the porous dielectric to air at an ambient atmosphere between exposures of the porous dielectric layer to the Aluminum gas precursor.

4. The method of claim 1 further comprising:
   varying the exposure of the porous dielectric to the Aluminum gas precursor to adjust a concentration of Aluminum in the porous dielectric layer.

5. The method of claim 4 further comprising:
   varying the concentration of Aluminum in the porous dielectric to modify a mechanical property of the porous dielectric layer.

6. The method of claim 1 further comprising:
   varying the amount of the Aluminum gas precursor to adjust a concentration of Aluminum in the porous dielectric layer.

7. The method of claim 6 further comprising:
   varying the concentration of Aluminum in the porous dielectric to modify a mechanical property of the porous dielectric layer.

8. The method of claim 1 wherein a concentration of the Aluminum in the Aluminum gas precursor is less than about 5%.

9. A method comprising:
   forming a porous dielectric material over a substrate;
   cleaning the porous dielectric material with a water-based cleaning solution to form Silanol groups in the porous dielectric material;
   reacting the Silanol groups with an Aluminum gas precursor;
   exposing the porous dielectric material with Trimethy Aluminum (TMA);
   exposing the porous dielectric material to air or oxygen; and
   repeating the saturating and exposing to increase formation of Aluminum bonds in the porous dielectric material.

10. The method of claim 9 wherein, after the reacting, the porous dielectric material has a Young's modulus (E) of about 10 or greater GPa, a hardness (H) of about 1 or greater GPa, and a dielectric constant of about 2 or greater.

* * * * *